Patented Dec. 6, 1927.

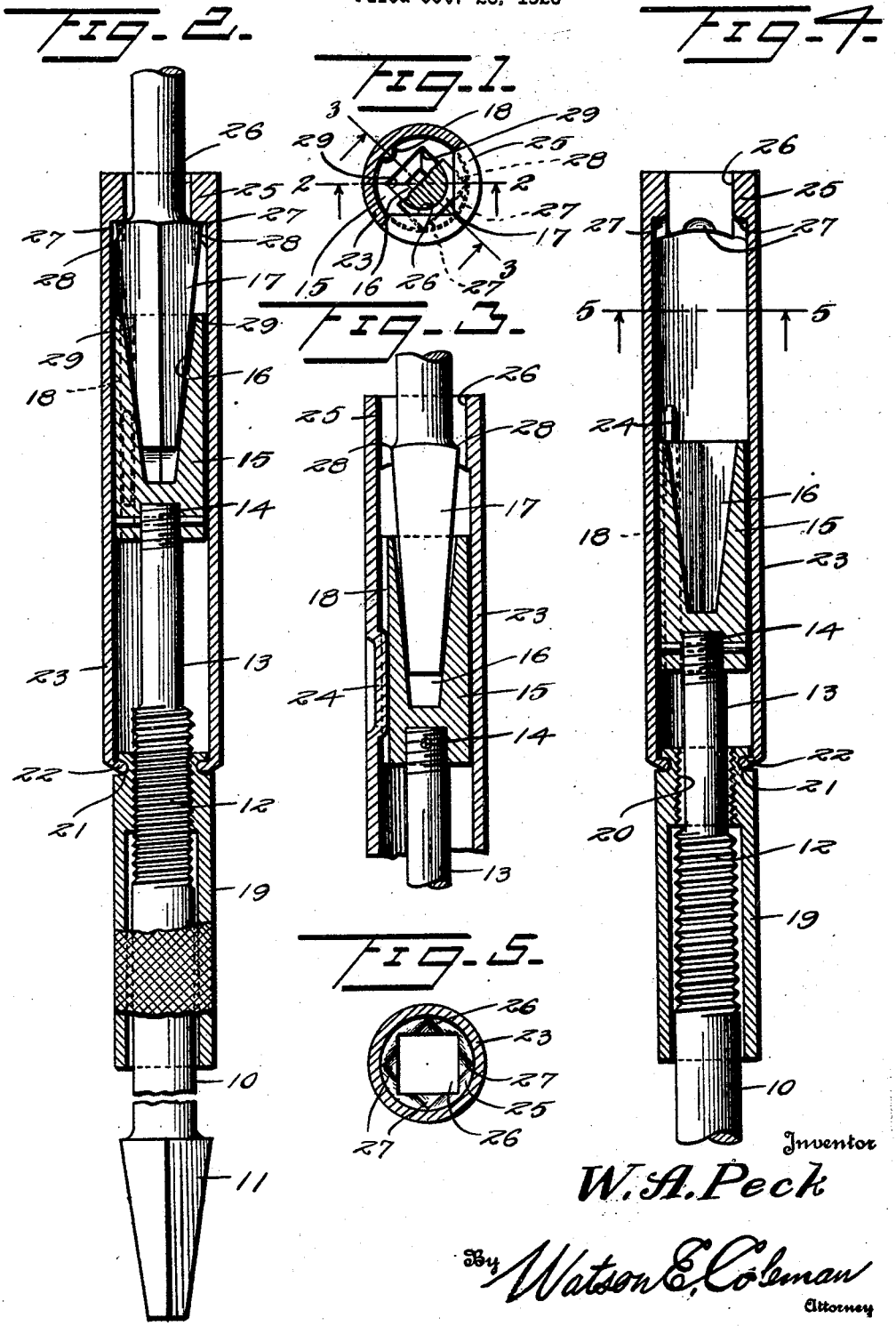

1,651,777

UNITED STATES PATENT OFFICE.

WILLIAM A. PECK, OF NEW HAVEN, CONNECTICUT.

EXTENSION-BIT HOLDER.

Application filed October 26, 1926. Serial No. 144,382.

This invention relates to extension bit holders and more particularly to a chucking device for extending the effective length of wood bits or the like which are provided with tapered rectangular shanks.

An important object of the invention is to provide a device of this character by means of which the shank is securely gripped at its opposite ends, thus preventing any oscillation of the bit with relation to the extension.

A further object of the invention is to provide a device of this character which is substantially sealed to thereby exclude chips or cuttings from entering the chuck and rendering the same inoperative.

A still further object of the invention is to provide a device of this character in which all likelihood of the chuck becoming loosened during operation of the drill is eliminated.

These and other objects I attain by the construction shown in the accompanying drawings, wherein for the purpose of illustration is shown a preferred embodiment of my invention and wherein:—

Figure 1 is an end view partially in elevation and partially in section of an extension bit holder constructed in accordance with my invention;

Figure 2 is a section on the line 2—2 of Figure 1;

Figure 3 is a section on the line 3—3 of Figure 1;

Figure 4 is a section similar to that shown in Figure 3 with the parts of the chuck in position to receive the shank of the bit;

Figure 5 is a section on the line 5—5 of Figure 4.

Referring now more particularly to the drawings, the numeral 10 indicates the body of an extension shank provided at one end with means 11 whereby it may be engaged in the chuck of a brace or the like. At its opposite end, the body is externally screw-threaded at 12 and has a reduced axial prolongation, the free end of which is likewise threaded, as at 14. This threaded end is engaged in the threaded bore formed in the lower end of a malleable iron socket 15. The upper end of this socket is provided with a frusto-pyramidal socket bore 16 for the reception of a frusto-pyramidal shank 17 of a drill bit. The chuck 15 is cylindrical in form and has in its outer surface a longitudinally extending groove 18, the purpose of which will presently appear.

Slidably mounted upon the reduced extension 13 of the extension shank is a nut 19, the threads 20 of which are adapted for coaction with the threads 12 at the upper end of the body 10. The exterior face of this nut is knurled for engagement with the hand and adjacent its upper end is formed with an annular groove 21. Spun into this groove at 22 is the lower end of the wall of a sleeve 23, the interior face of which slidably fits the exterior face of the chuck 15 and is formed with an inwardly pressed spline key 24 for engagement in the groove 18 of the chuck. At its upper end, the sleeve is formed with an inwardly extending flange 25 having a rectangular opening 26 formed therethrough of a size to permit passage of the shank 17 of the drill. This flange at its under surface and intermediate the ends of the side faces of the opening 26 is formed with notches 27 into which the corners 28 of the upper or larger end of the frusto-pyramidal bit shank 17 may extend. These notches are so positioned that they align with the corners 29 of the frusto-pyramidal bore 16 of the socket chuck 15, so that a bit shank 17 engaged therein will have its upper corners directed into these notches as the chuck 15 moves toward the flange 25. In the preferred construction, the faces of the bore 16 and of the opening 26 are circumferentially spaced 45° from one another, so that the notches 27 are located midway the ends of the side walls of the opening 26.

In the operation of the device, to insert a drill bit, the nut 19 is rotated until its threads 20 disengage from the threads 12. Holding the extension through the nut, the shank 10 will drop, by gravity, until the chuck 15 is spaced from the under surface of the flange 25 a distance greater than the length of the shank 17 of the drill. The drill is then passed through the opening 26 and engaging the chuck will automatically rotate to properly seat therein and by this rotation will place the corners 28 thereof in alignment with the notches 27. The shank 10 is then engaged with the hand, with the result that the nut 19 and sleeve 23 will drop until the threads of the nut 19 engage with the threads 12. The nut 19 is then rotated until the flange 25 firmly engages against the upper end of the shank 17, wedging it into the socket and its corners into the notches 27, so that a double grip at opposite ends of the shank is obtained. This double grip effectually prevents any movement whatever on the part of the drill with relation to the extension. The nut 19 is made of less external diameter than the sleeve 23, so that there is no danger of this nut coming into engagement with the walls of the bore formed by the drill and being thereby rotated to free the drill for movement in the socket.

It is pointed out that in the construction of drill bits, while an endeavor is made to have the shanks thereof standardized, these shanks differ not only in actual size, but in taper, with the result that a socket which will properly fit one shank will engage another shank either only at its very end or at a point intermediate its ends. Under these conditions, the shank is free to wobble in the socket, with the result that crooked bores are formed and bits become jammed and possibly broken. By providing the double grip hereinbefore set forth, this wobbling is entirely eliminated, even though the shanks 17 fail to properly fit the shank receiving bore 16.

Since the construction hereinbefore set forth is obviously capable of a certain range of change and modification without materially departing from the spirit of the invention, I do not limit myself to such specific structure except as hereinafter claimed.

I claim:—

1. In an extension holder for drill bits and the like having frusto-pyramidal shanks, a socket having a frusto-pyramidal socket bore to receive the shank, a sleeve within which the socket is longitudinally shiftable, means holding the socket against rotation with relation to the sleeve, a flange upon the sleeve opposing the open end of the bore of the socket and having notches formed in its socket opposing face adapted to receive the corners of the larger end of a bit shank engaged in the socket bore, the sleeve having an opening for inserting a bit shank to the socket and means for securing the sleeve and socket in adjusted position.

2. In an extension holder for drill bits and the like having frusto-pyramidal shanks, a socket having a frusto-pyramidal socket bore to receive the shank, a sleeve within which the socket is longitudinally shiftable, means holding the socket against rotation with relation to the sleeve, a flange upon the sleeve opposing the open end of the bore of the socket and having notches formed in its socket opposing face adapted to receive the corners of the larger end of a bit shank engaged in the socket bore, said flange having a rectangular opening permitting the passage of the larger end of the bit shank, the walls of said opening being circumferentially displaced with respect to the walls of the socket bore and means for securing the sleeve and socket in adjusted positions.

In testimony whereof I hereunto affix my signature.

WILLIAM A. PECK.